US010824062B2

United States Patent
Tsai et al.

(10) Patent No.: US 10,824,062 B2
(45) Date of Patent: Nov. 3, 2020

(54) ILLUMINATION SYSTEM HAVING TWO SENSORS, PROJECTION DEVICE COMPRISING SUCH AN ILLUMINATION SYSTEM AND ILLUMINATION CONTROL METHOD THEREOF

(71) Applicant: Coretronic Corporation, Hsin-Chu (TW)

(72) Inventors: Chih-Hsien Tsai, Hsin-Chu (TW); Haw-Woei Pan, Hsin-Chu (TW); Yi-Hsuang Weng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/408,476

(22) Filed: May 10, 2019

(65) Prior Publication Data

US 2019/0354001 A1 Nov. 21, 2019

(30) Foreign Application Priority Data

May 17, 2018 (CN) .......................... 2018 1 0471430

(51) Int. Cl.
G03B 21/20 (2006.01)
(52) U.S. Cl.
CPC ........... *G03B 21/20* (2013.01); *G03B 21/204* (2013.01); *G03B 21/208* (2013.01)
(58) Field of Classification Search
CPC .... G03B 21/20; G03B 21/204; G03B 21/208; G02B 26/008
See application file for complete search history.

(56) References Cited

U.S. PATENT DOCUMENTS

| 2004/0008288 | A1* | 1/2004 | Pate ..................... H04N 9/3182 348/742 |
| 2007/0139616 | A1* | 6/2007 | DeCusatis ............ H04N 13/341 353/7 |
| 2015/0241764 | A1* | 8/2015 | Hung .................. G03B 21/2053 353/31 |
| 2017/0289511 | A1* | 10/2017 | Usami .................. H04N 9/3155 |
| 2018/0249137 | A1* | 8/2018 | Kobayashi ............. G03B 21/14 |

FOREIGN PATENT DOCUMENTS

| CN | 101858496 | 7/2012 |
| CN | 102854592 | 6/2016 |
| CN | 107077050 | 8/2017 |
| CN | 208188569 U | * 12/2018 ............. G03B 21/20 |

\* cited by examiner

*Primary Examiner* — Michelle M Iacoletti
*Assistant Examiner* — Magda Cruz
(74) *Attorney, Agent, or Firm* — JCIPRNET

(57) ABSTRACT

The disclosure relates to an illumination system, a projection device and an illumination control method. The illumination system includes a first sensor, a second sensor and a control module. The first sensor receives a part of an excitation beam and a part of at least one converted beam scattered by a wavelength conversion module, so as to generate a first photoelectric signal. The second sensor receives a part of a first set of color light and a part of a second set of color light scattered by a filter module, so as to generate a second photoelectric signal. The control module generates a synchronization signal based on relative intensity changes of the first and second photoelectric signals. The synchronization signal is to synchronize the wavelength conversion module with the filter module, and the first set of color light and the second set of color light sequentially form an illumination beam.

22 Claims, 11 Drawing Sheets

ILLUMINATION SYSTEM HAVING TWO SENSORS, PROJECTION DEVICE COMPRISING SUCH AN ILLUMINATION SYSTEM AND ILLUMINATION CONTROL METHOD THEREOF

CROSS-REFERENCE TO RELATED APPLICATION

This application claims the priority benefit of China application serial no. 201810471430.X, filed on May 17, 2018. The entirety of the above-mentioned patent application is hereby incorporated by reference herein and made a part of this specification.

BACKGROUND

Technical Field

The disclosure relates to an optical system, an optical device including the above optical system, and a control method, and more particularly, to an illumination system, a projection device, and an illumination control method.

Related Art

Recently, projection devices mainly using solid-state light sources such as light-emitting diodes (LEDs) and laser diodes are gaining an increasing market share. Generally, excitation light of these solid-state light sources is converted into excited light of different colors by a wavelength conversion material on a wavelength conversion module in the projection devices. Moreover, in order to satisfy color performance requirements, a filter module may be placed on a rear segment of an optical path of the projection devices, and the excited light formed by the wavelength conversion module passes through the filter module and is then filtered into predetermined color light. The color light is modulated by a light valve and an image beam is projected to outside. Therefore, synchronization control of the wavelength conversion module, the filter module and the light valve is very important. If a rotation period of any of them is advanced or delayed, the final output image beam may fail to achieve expected color performance.

Generally, in a synchronization control mechanism in the existing projection devices, a light absorbing black sticker is attached to motors of the wavelength conversion module and the filter module to serve as timing marks, and is used in combination with a set of a light source and a light sensor, wherein the light sensor is used to detect the intensity of a light source signal so as to determine the rotation period of the wavelength conversion module and the filter module. However, since the timing marks are attached manually, fixed assembly processes are required and an error easily occurs during assembly. In addition, in the existing projection devices, a chromaticity sensor may be disposed on a projection screen to detect the color performance of the image beam from the projection devices. When the color performance of the image beam is below expectations, a current intensity of the solid-state light source that corresponds to the color light in each time sequence needs to be adjusted manually, so as to achieve the expected color performance of the image beam.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The disclosure provides an illumination system that is easily assembled.

The disclosure provides a projection device that is easily assembled.

The disclosure provides an illumination control method capable of easily adjusting an illumination beam.

Other objectives and advantages of the disclosure may be further understood from the technical features disclosed in the disclosure.

To achieve one of, some of or all of the above objectives or other objectives, an embodiment of the disclosure proposes an illumination system. The illumination system is configured to provide an illumination beam, and includes an excitation light source, a wavelength conversion module, a first sensor, a filter module, a second sensor and a control module. The excitation light source is configured to emit an excitation beam. The wavelength conversion module is located on a transmission path of the excitation beam, and has at least one wavelength conversion area configured to convert the excitation beam into at least one converted beam. The first sensor is located beside and faces the transmission path of the excitation beam, and is configured to receive a part of the excitation beam and a part of the at least one converted beam that are scattered by the wavelength conversion module, so as to generate a first photoelectric signal. The filter module is located on the transmission path of the excitation beam and the at least one converted beam, and has at least one filter area and a diffusion area, wherein the at least one filter area is configured to cause the at least one converted beam to form a first set of color light, and the diffusion area is configured to cause the excitation beam to form a second set of color light. The second sensor is located beside and faces a transmission path of the first set of color light and the second set of color light, and is configured to receive a part of the first set of color light and a part of the second set of color light that are scattered by the filter module, so as to generate a second photoelectric signal. The control module is electrically connected to the first sensor and the second sensor, and is configured to receive the first photoelectric signal and the second photoelectric signal. The control module generates a synchronization signal based on a relative intensity change of the first photoelectric signal and a relative intensity change of the second photoelectric signal. The synchronization signal is transmitted to the wavelength conversion module and the filter module, so that the wavelength conversion module and the filter module are controlled to synchronize with each other, and the first set of color light and the second set of color light formed by the filter module sequentially form the illumination beam.

To achieve one of, some of or all of the above objectives or other objectives, an embodiment of the disclosure proposes a projection device. The projection device includes the above illumination system, a light valve and a projection lens. The light valve is located on a transmission path of the illumination beam and is configured to convert the illumination beam into an image beam. The projection lens is located on a transmission path of the image beam and is configured to cause the image beam to form a projection beam.

To achieve one of, some of or all of the above objectives or other objectives, an embodiment of the disclosure proposes an illumination control method. The illumination control method is configured to control an illumination system in a projection device. The illumination system includes an excitation light source, a wavelength conversion module and a filter module. The excitation light source is configured to emit an excitation beam. The wavelength conversion module is located on a transmission path of the excitation beam, and is configured to convert the excitation beam into at least one converted beam. The filter module is located on the transmission path of the excitation beam and the at least one converted beam, and is configured to cause the at least one converted beam to form a first set of color light, and to cause the excitation beam to form a second set of color light. The illumination control method includes the following steps. A part of the excitation beam and a part of the at least one converted beam that are scattered by the wavelength conversion module are sensed, so as to generate a first photoelectric signal. A part of the first set of color light and a part of the second set of color light that are scattered by the filter module are sensed, so as to generate a second photoelectric signal. A synchronization signal is generated based on a relative intensity change of the first photoelectric signal and a relative intensity change of the second photoelectric signal. The synchronization signal is transmitted to the wavelength conversion module and the filter module, so as to control the wavelength conversion module and the filter module to synchronize with each other, and to cause the first set of color light and the second set of color light formed by the filter module to sequentially form an illumination beam.

Based on the above, in the embodiments of the disclosure, by acquiring the first photoelectric signal of a wavelength band of a light from the wavelength conversion module and the second photoelectric signal of a light wavelength band of a light from the filter module, the illumination system and the projection device generate the synchronization signal. In this way, there is no need to additionally attach a timing mark and the number of assembly processes can be decreased. Also, a risk that assembly tolerance may cause a time error in the synchronization control can be avoided. The illumination control method according to the embodiments of the disclosure can easily adjust the illumination beam in the above illumination system and projection device such that the wavelength conversion module and the filter module can be synchronized and the final output image beam can have good color performance.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
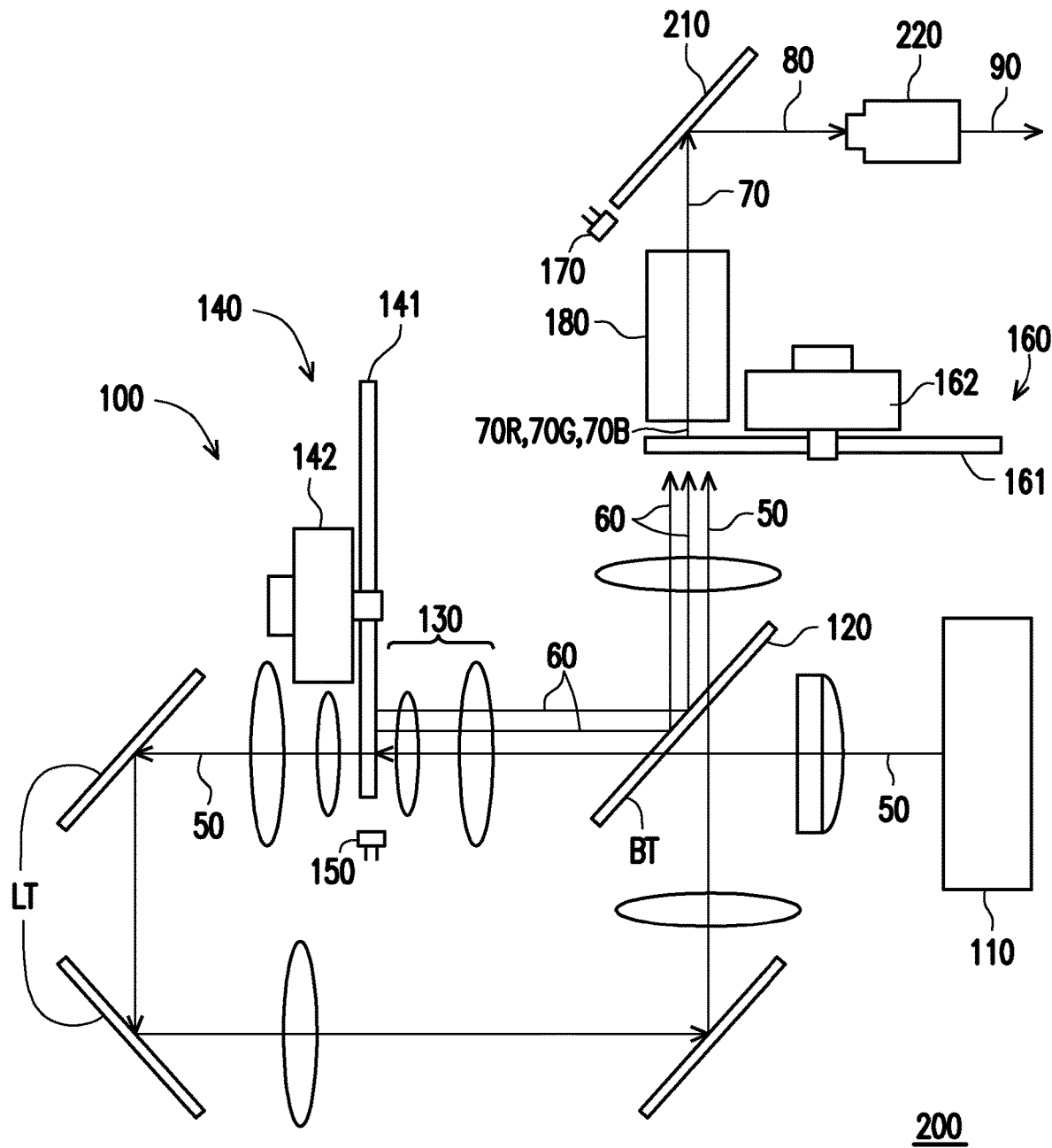
FIG. 1A is a schematic view showing architecture of a projection device according to an embodiment of the disclosure.
Figure 1B:
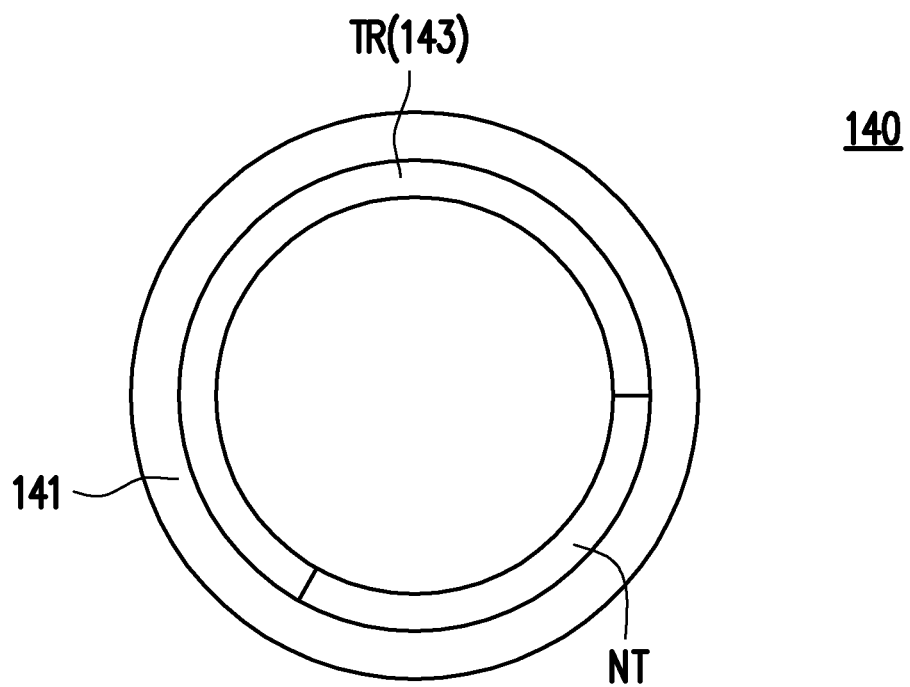
FIG. 1B is a schematic view showing architecture of a wavelength conversion module in FIG. 1A.
Figure 1C:
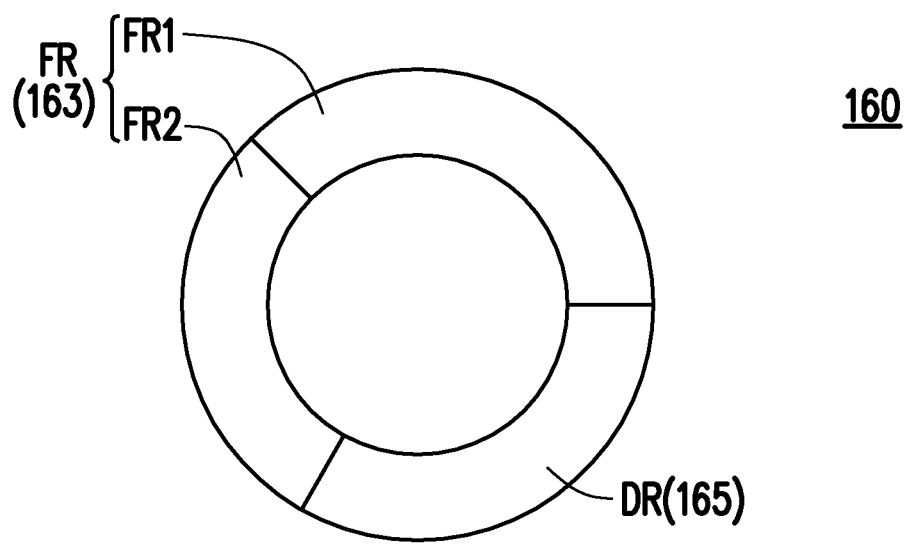
FIG. 1C is a schematic view showing architecture of a filter module in FIG. 1A.

FIG. 1A is a schematic view showing architecture of a projection device according to an embodiment of the disclosure. FIG. 1B is a schematic view showing architecture of a wavelength conversion module in FIG. 1A. FIG. 1C is a schematic view showing architecture of a filter module in FIG. 1A. Referring to FIG. 1A, a projection device 200 includes an illumination system 100, a light valve 210 and a projection lens 220. In the embodiment, the light valve 210 is, for example, a digital micro-mirror device (DMD) or a liquid-crystal-on-silicon panel (LCOS panel). However, in other embodiments, the light valve 210 may be a transmissive liquid crystal panel or other light beam modulator.

Specifically, as shown in FIG. 1A, in the embodiment, the illumination system 100 is configured to provide an illumination beam 70, and the illumination system 100 includes an excitation light source 110, a wavelength conversion module 140, a first sensor 150, a filter module 160 and a second sensor 170. The excitation light source 110 is configured to emit an excitation beam 50. For example, in the embodiment, the excitation light source 110 is a laser light source, and the excitation beam 50 is a blue laser beam. The excitation light source 110 may include a plurality of blue laser diodes (not illustrated) arranged in array. However, the disclosure is not limited thereto.

Figure 4:
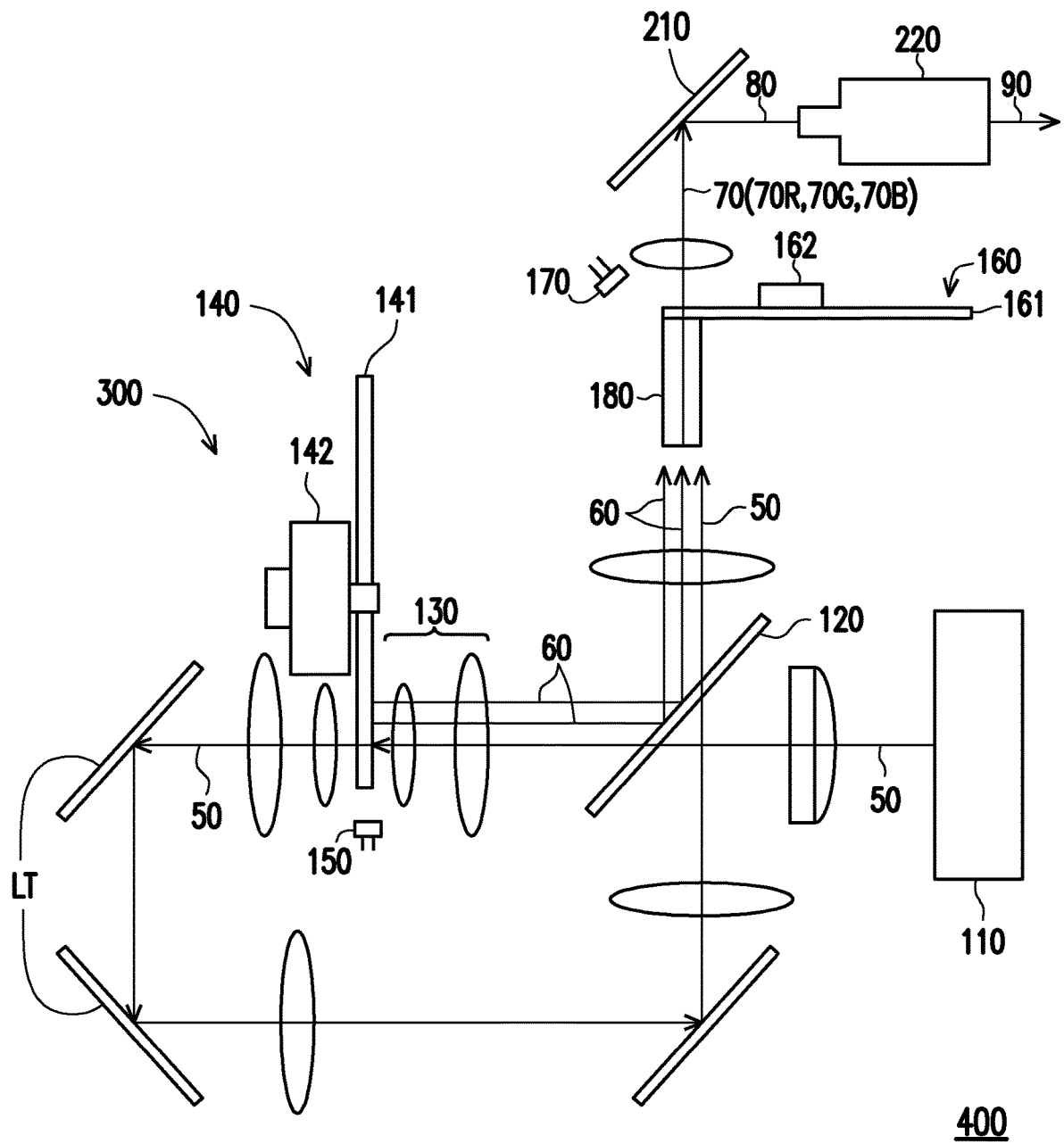
FIG. 4 is a schematic view showing architecture of another projection device according to an embodiment of the disclosure.

Specifically, as shown in FIG. 1A, in the embodiment, the illumination system 100 further includes a light combining unit 120. The light combining unit 120 is located between the excitation light source 110 and the wavelength conversion module 140, and is located on a transmission path of at least one converted beam 60 and the excitation beam 50. Specifically, the light combining unit 120 may be a partially transmissive, partially reflective element, a dichroic element, a polarization beam splitter element or any other element capable of splitting a light beam. For example, in the embodiment, a laser transmission area BT of the light combining unit 120 may allow a blue beam to pass therethrough and reflect beams of other colors (e.g., red, green, yellow and so on). That is, the laser transmission area BT of the light combining unit 120 may allow the excitation beam 50 of blue color to pass therethrough. In this way, the excitation beam 50 may pass through the light combining unit 120 and is incident to the wavelength conversion module 140. In addition, as shown in FIG. 4, in the embodiment, the illumination system 100 further includes a lens set 130. The lens set 130 is located between the excitation light source 110 and the wavelength conversion module 140, and is capable of condensing the excitation beam 50 at the wavelength conversion module 140.

Specifically, as shown in FIG. 1A, in the embodiment, the wavelength conversion module 140 is located on the transmission path of the excitation beam 50. For example, as shown in FIG. 1B, in the embodiment, the wavelength conversion module 140 has at least one wavelength conversion area TR and a non-conversion area NT. The wavelength conversion area TR is configured to convert the excitation beam 50 into the at least one converted beam 60, and the non-conversion area NT of the wavelength conversion module 140 is configured to transmit the excitation beam 50 to a subsequent optical element.

For example, as shown in FIG. 1A and FIG. 1B, in the embodiment, the wavelength conversion module 140 further includes a first substrate 141, at least one wavelength conversion layer 143 and a first driving device 142 (e.g., a motor). As shown in FIG. 1B, in the embodiment, the at least one wavelength conversion layer 143 is disposed on the first substrate 141, and is disposed corresponding to the at least one wavelength conversion area TR. For example, in the embodiment, the number of the wavelength conversion area TR is one, and the wavelength conversion layer 143 located in the wavelength conversion area TR is, for example, a yellow phosphor powder layer, thus forming a yellow converted beam 60. However, the disclosure is not limited thereto. In another embodiment not illustrated, the number of the wavelength conversion area TR may be plural, and the wavelength conversion layer 143 located in the wavelength conversion area TR may be a yellow phosphor powder layer or a green phosphor powder layer, thus forming a yellow or green converted beam 60.

Moreover, as shown in FIG. 1A and FIG. 1B, in the embodiment, the first driving device 142 is configured to drive the first substrate 141 to rotate. When the first substrate 141 rotates, the at least one wavelength conversion area TR and the non-conversion area NT enter an irradiation range of the excitation beam 50 during different periods. For example, as shown in FIG. 1A and FIG. 1B, in the embodiment, when the non-conversion area NT enters the irradiation range of the excitation beam 50, the excitation beam 50 passes through the wavelength conversion module 140 and is transmitted to the filter module 160 via a light transmission module LT. In another aspect, in the embodiment, when the at least one wavelength conversion area TR enters the irradiation range of the excitation beam 50, the excitation beam 50 is converted into the at least one converted beam 60 by the at least one wavelength conversion area TR. Afterwards, as shown in FIG. 1A, the at least one converted beam 60 from the wavelength conversion module 140 is collected by the lens set 130, then guided to the light combining unit 120, and then reflected onto the subsequent filter module 160.

As shown in FIG. 1A, in the embodiment, the first sensor 150 is located beside and faces the transmission path of the excitation beam 50, and is configured to receive a part of the excitation beam 50 and a part of the at least one converted beam 60 that are scattered by the wavelength conversion module 140, so as to generate a first photoelectric signal PS1.

In another aspect, as shown in FIG. 1A and FIG. 1C, in the embodiment, the filter module 160 is located on the transmission path of the excitation beam 50 and the at least one converted beam 60, and has at least one filter area FR and a diffusion area DR. For example, in the embodiment, the number of the filter area FR is two, including a filter area FR1 and a filter area FR2, and the filter area FR is configured to cause the at least one converted beam 60 to form a first set of color lights 70R and 70G The diffusion area DR is configured to cause the excitation beam 50 to form a second set of color light 70B.

More specifically, as shown in FIG. 1C, in the embodiment, the filter module 160 includes a second substrate 161, at least one filter layer 163, a diffusion layer 165 and a second driving device 162 (e.g., a motor). The at least one filter layer 163 is disposed on the second substrate 161 and is disposed corresponding to the at least one filter area FR. For example, the filter layer 163 may include a red filter and a green filter and be disposed corresponding to the filter areas FR1 and FR2. Accordingly, the first set of color lights 70R and 70G may include red light and green light. However, the disclosure is not limited thereto.

In another aspect, as shown in FIG. 1C, in the embodiment, the diffusion layer 165 is disposed on the second substrate 161 and is disposed corresponding to the diffusion area DR. For example, in the embodiment, the diffusion layer 165 may be a light diffuser sheet and is configured to diverge the excitation beam 50 to form blue light, and also to reduce the speckle effect caused by excitation light. That is, in the embodiment, the second set of color light 70B is, for example, blue light.

In another aspect, as shown in FIG. 1A, in the embodiment, the second sensor 170 is located beside and faces a transmission path of the first set of color lights 70R and 70G and the second set of color light 70B, and is configured to receive a part of the first set of color lights 70R and 70G and a part of the second set of color light 70B that are scattered by the filter module 160, so as to generate a second photoelectric signal PS2.

More specifically, as shown in FIG. 1A and FIG. 1C, in the embodiment, the second driving device 162 is configured to drive the second substrate 161 to rotate. When the second substrate 161 rotates, the at least one filter area FR enters an irradiation range of the at least one converted beam 60 during different periods, and the diffusion area DR enters the irradiation range of the excitation beam 50 during different periods. More in detail, in the embodiment, when the non-conversion area NT of the wavelength conversion module 140 enters the irradiation range of the excitation beam 50, the diffusion area DR of the filter module 160 synchronously enters the irradiation range of the excitation beam 50 transmitted to the filter module 160. When the at least one wavelength conversion area TR of the wavelength conversion module 140 enters the irradiation range of the excitation beam 50, the filter area FR of the filter module 160 synchronously enters the irradiation range of the at least one converted beam 60. In this way, the first set of color lights 70R and 70G and the second set of color light 70B formed by the filter module 160 can sequentially form the illumination beam 70.

A process of controlling the synchronization between the wavelength conversion module 140 and the filter module 160 will be explained further below with reference to FIG. 2A to FIG. 2D.

Figure 2A:
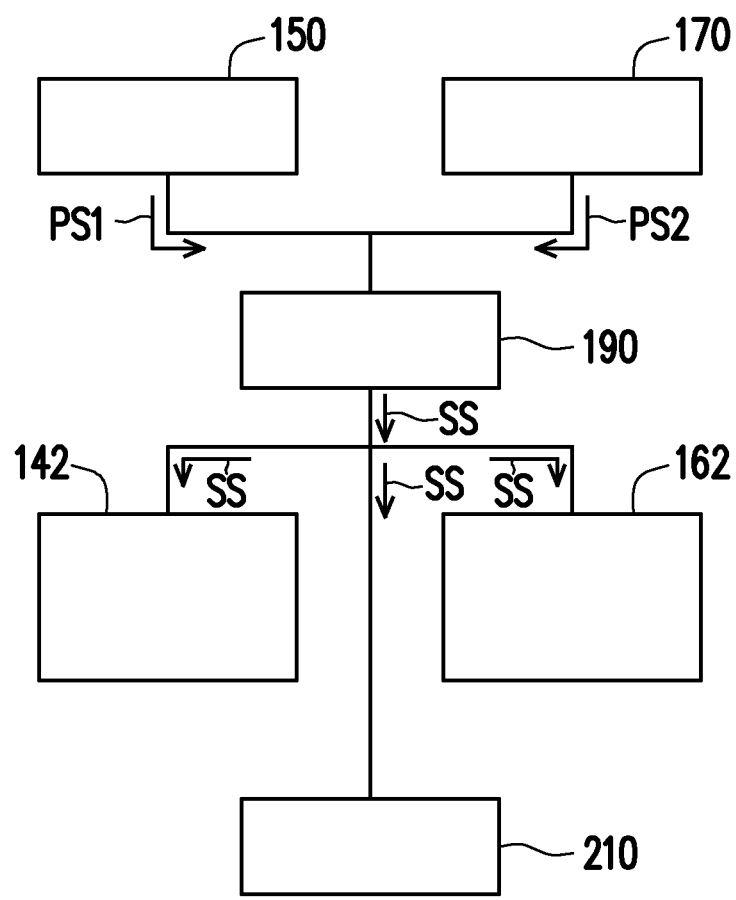
FIG. 2A is a block view showing a control module and other members according to an embodiment of the disclosure.
Figure 2B:
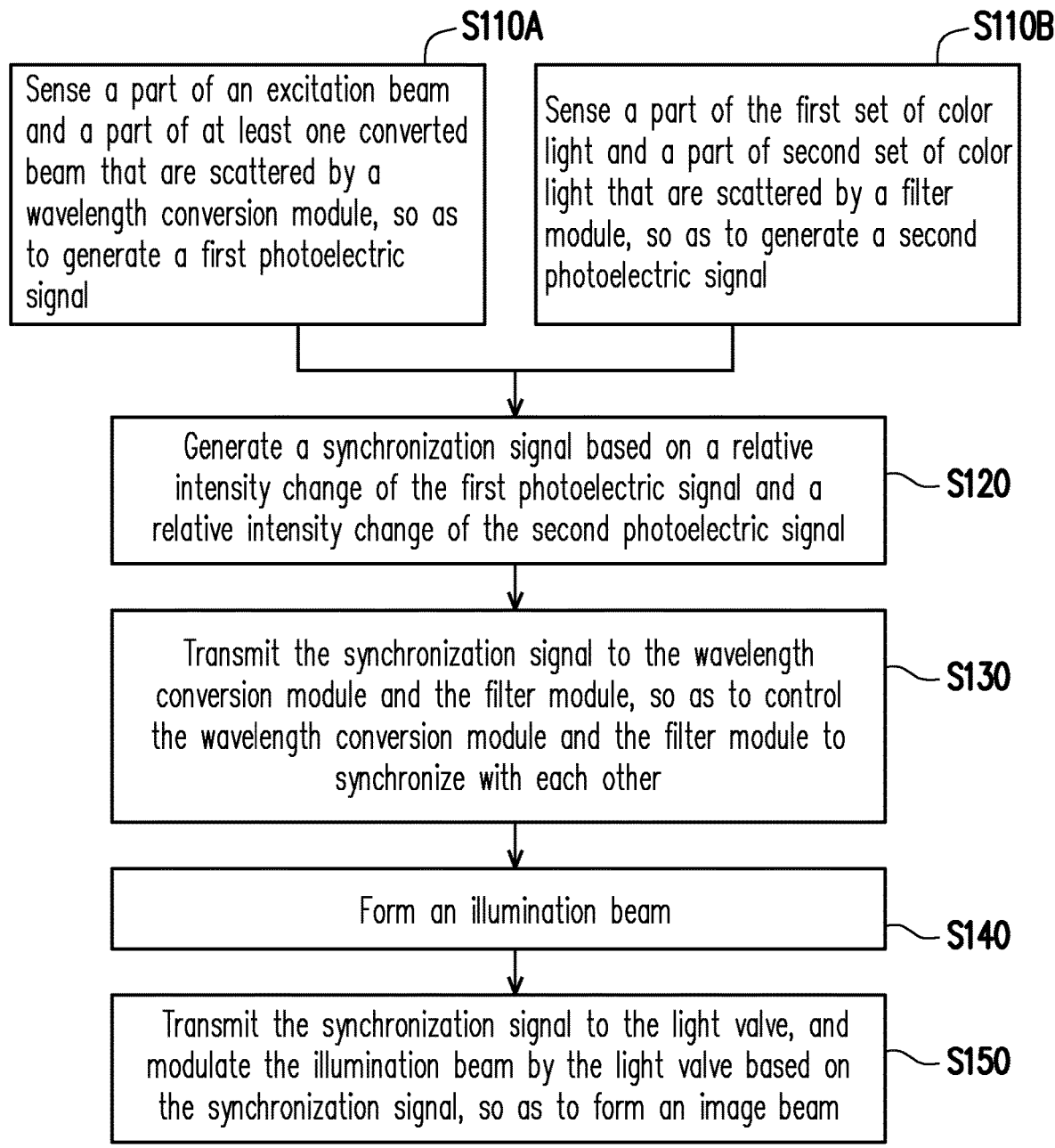
FIG. 2B is a flowchart of an illumination control method according to an embodiment of the disclosure.
Figure 2C:
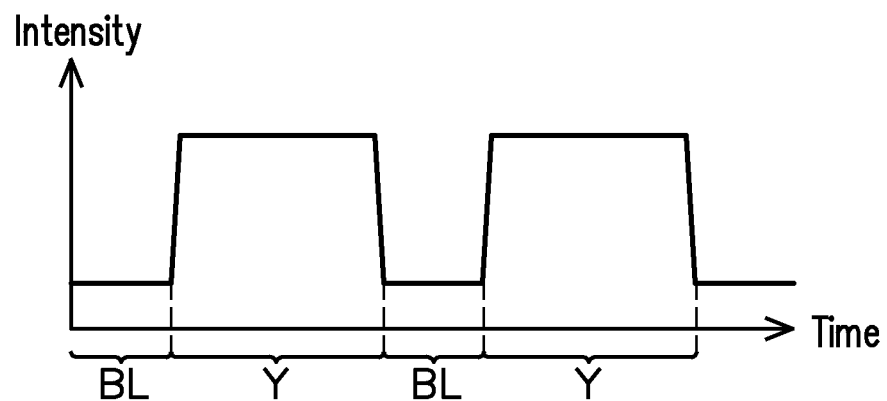
FIG. 2C is a schematic view showing a change in intensity of a first photoelectric signal according to an embodiment of the disclosure.
Figure 2D:
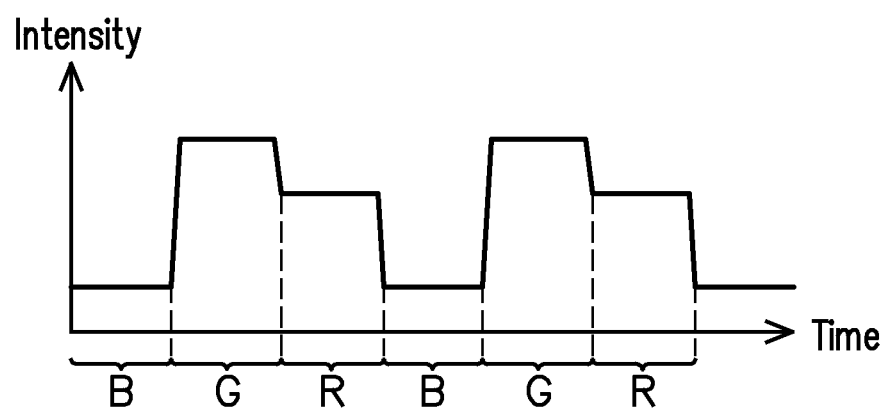
FIG. 2D is a schematic view showing a change in intensity of a second photoelectric signal according to an embodiment of the disclosure.

FIG. 2A is a block view showing a control module and other members according to an embodiment of the disclosure. FIG. 2B is a flowchart of an illumination control method according to an embodiment of the disclosure. FIG. 2C is a schematic view showing a change in intensity of a first photoelectric signal according to an embodiment of the disclosure. FIG. 2D is a schematic view showing a change in intensity of a second photoelectric signal according to an embodiment of the disclosure. Referring to FIG. 2A, in the embodiment, the illumination system 100 further includes a control module 190. The control module 190 is electrically connected to the first sensor 150 and the second sensor 170, and is configured to receive the first photoelectric signal PS1 generated by the first sensor 150 and the second photoelectric signal PS2 generated by the second sensor 170. In another aspect, the control module 190 is electrically connected to the first driving device 142, the second driving device 162 and the light valve 210, and is configured to, based on information of the first photoelectric signal PS1 or the second photoelectric signal PS2, generate and provide a corresponding control signal (e.g., a synchronization signal SS or a current control signal CS) to a corresponding optical member, so as to control operation of the illumination system 100 and the projection device 200. For example, the illumination system 100 and the projection device 200 shown in FIG. 1A and FIG. 2A may be used to execute the illumination control method in FIG. 2B, so as to synchronize the wavelength conversion module 140 with the filter module 160. However, the disclosure is not limited thereto.

Specifically, as shown in FIG. 2B, in the embodiment, the first sensor 150 and the second sensor 170 are configured to execute steps S110A and S110B, respectively. In detail, as shown in FIG. 1A, FIG. 2A and FIG. 2B, in the embodiment, the first sensor 150 is configured to sense the part of the excitation beam 50 and the part of the at least one converted beam 60 that are scattered by the wavelength conversion module 140, so as to generate the first photoelectric signal PS1; the second sensor 170 is configured to sense the part of the first set of color lights 70R and 70G and the part of the second set of color light 70B that are scattered by the filter module 160, so as to generate the second photoelectric signal PS2.

Next, the control module 190 is configured to execute steps S120 and S130. Specifically, as shown in FIG. 2A and FIG. 2B, in step S120, after receiving the first photoelectric signal PS1 and the second photoelectric signal PS2, the control module 190 generates a synchronization signal SS based on a relative intensity change of the first photoelectric signal PS1 and a relative intensity change of the second photoelectric signal PS2. Next, in step S130, the synchronization signal SS is transmitted to the wavelength conversion module 140 and the filter module 160, so as to control the wavelength conversion module 140 and the filter module 160 to synchronize with each other.

More specifically, since the human eye requires different light intensities when sensing light of different colors, when light beams of different colors are output, intensity change of each light beam tends to be adjusted according to a matching ratio relationship between the color light and the human eye or other requirements. In other words, light beams of different colors correspond to different intensities. Specifically, as shown in FIG. 2C, in the embodiment, since the excitation beam 50 is blue light and the converted beam 60 is yellow light, their intensities are significantly different. Therefore, when the most significant relative intensity change (i.e., at a boundary between wavelength bands BL and Y as shown in FIG. 2C) appears in a wavelength band of the first photoelectric signal PS1, it means that in the wavelength conversion module 140 shown in FIG. 1A and FIG. 1B, a boundary between the non-conversion area NT that allows the excitation beam 50 to pass therethrough and the at least one wavelength conversion area TR that generates the converted beam 60 is currently entering the irradiation range of the excitation beam 50. Likewise, as shown in FIG. 2D, in the embodiment, when the most significant relative intensity change (i.e., at a boundary between wavelength bands B and G as shown in FIG. 2D) appears in a wavelength band of the second photoelectric signal PS2, it means that in the filter module 160 shown in FIG. 1A and FIG. 1C, a boundary between the diffusion area DR that generates the second set of color light 70B and the filter area FR that generates the first set of color lights 70R and 70G is currently entering the irradiation range of the excitation beam 50.

Therefore, as shown in FIG. 2B to FIG. 2D, the control module 190 is capable of determining whether the at least one wavelength conversion area TR has entered the irradiation range of the excitation beam 50 or not based on the relative intensity change of the first photoelectric signal PS1, and of determining whether the at least one filter area FR has entered the irradiation range of the at least one converted beam 60 or not based on the relative intensity change of the second photoelectric signal PS2.

Accordingly, the control module 190 generates the synchronization signal SS. The first driving device 142 of the wavelength conversion module 140 controls a rotation period of the first substrate 141 based on the synchronization signal SS from the control module 190; the second driving device 162 of the filter module 160 controls a rotation period of the second substrate 161 based on the synchronization signal SS from the control module 190. In this way, as shown in FIG. 1A to FIG. 1C, based on the synchronization signal SS from the control module 190, the first driving device 142 of the wavelength conversion module 140 and the second driving device 162 of the filter module 160 respectively control the following. When the at least one wavelength conversion area TR of the wavelength conversion module 140 enters the irradiation range of the excitation beam 50 emitted from the excitation light source 110, the at least one filter area FR of the filter module 160 correspondingly enters the irradiation range of the at least one converted beam 60 at this moment, so that the wavelength conversion module 140 and the filter module 160 are controlled to synchronize with each other, and the first set of color lights 70R and 70G and the second set of color light 70B can be sequentially formed by the filter module 160.

In addition, as shown in FIG. 1A, in the embodiment, the illumination system 100 further includes a light homogenizing element 180. The light homogenizing element 180 is located between the filter module 160 and the light valve 210, and is located on the transmission path of the first set of color lights 70R and 70G and the second set of color light 70B. In the embodiment, the light homogenizing element 180 includes an integration rod. However, the disclosure is not limited thereto. More in detail, as shown in FIG. 1A, when the first set of color lights 70R and 70G and the second set of color light 70B formed by the filter module 160 are transmitted to the light homogenizing element 180, the light homogenizing element 180 homogenizes the first set of color lights 70R and 70G and the second set of color light 70B to sequentially form the illumination beam 70, and transmits the illumination beam 70 to the light valve 210. Up to this point, step S140 is completed.

Next, the control module 190 is configured to execute step S150. Specifically, as shown in FIG. 1A, the light valve 210 is located on a transmission path of the illumination beam 70. Moreover, as shown in FIG. 2A and FIG. 2B, in step S150, the control module 190 is electrically connected to the light valve 210 and transmits the synchronization signal SS to the light valve 210. Moreover, the light valve 210 modulates the illumination beam 70 based on the synchronization signal SS from the control module 190, so as to form an image beam 80. In this way, the light valve 210 is capable of sequentially converting the illumination beam 70 into the image beam 80 of different colors, and transmitting it to the projection lens 220.

In addition, as shown in FIG. 1A, in the embodiment, the projection lens 220 is located on a transmission path of the image beam 80 and is configured to cause the image beam 80 to form a projection beam 90, so as to project the projection beam 90 onto a screen (not illustrated) to form an image frame.

According to the illumination control method shown in FIG. 2B, in the illumination system 100 and the projection device 200, by synchronizing the wavelength conversion module 140 with the filter module 160 by determining the first photoelectric signal PS1 and the second photoelectric signal PS2, the illumination beam 70 in the above illumination system 100 and projection device 200 can be easily adjusted. In this way, there is no need to additionally attach a timing mark and the number of assembly processes can be decreased. Also, the risk that assembly tolerance may cause a time error in the synchronization control can be avoided.

How to adjust color coordinates of the illumination beam 70 will be explained further below with reference to FIG. 3A to FIG. 3B.

Figure 3A:
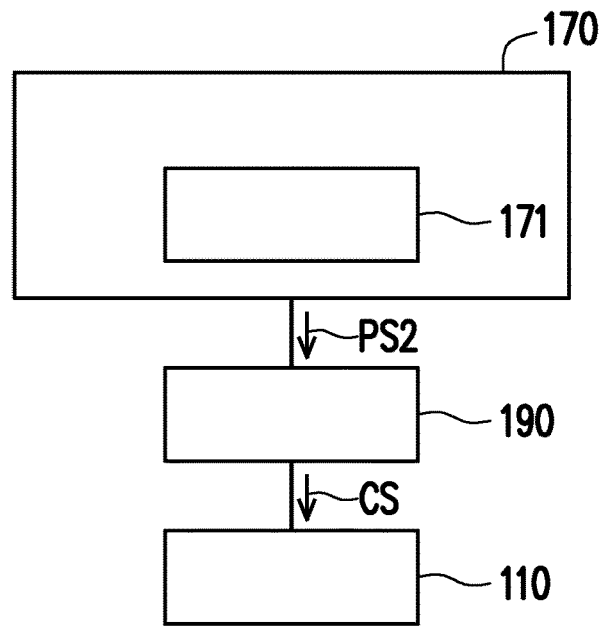
FIG. 3A is a block view showing a second sensor and other members according to an embodiment of the disclosure.

FIG. 3A is a block view showing a second sensor and other members according to an embodiment of the disclosure. FIG. 3B is a flowchart of a chromaticity adjustment step of an illumination control method according to an embodiment of the disclosure. Referring to FIG. 3A, in the embodiment, the control module 190 is electrically connected to the second sensor 170, and is configured to receive the second photoelectric signal PS2. In another aspect, the control module 190 is electrically connected to the excitation light source 110, and the second sensor 170 includes a chromaticity sensor 171. For example, the projection device 200 shown in FIG. 1A and the control module 190 shown in FIG. 1A are configured to execute the illumination control method in FIG. 3B to adjust the color coordinates of the illumination beam 70. However, the disclosure is not limited thereto.

Figure 3B:
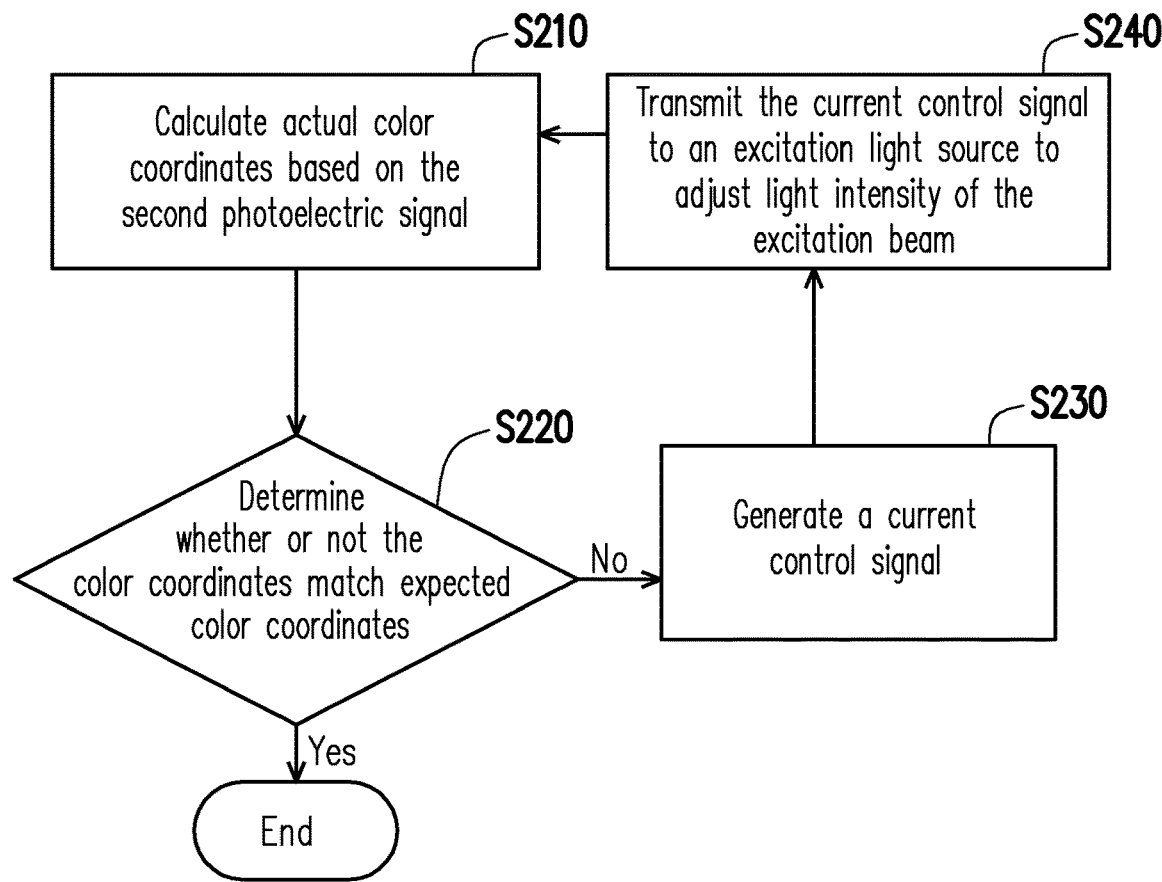
FIG. 3B is a flowchart of a chromaticity adjustment step of an illumination control method according to an embodiment of the disclosure.

Specifically, as shown in FIG. 3B, in the embodiment, the control module 190 is configured to execute steps S210, S220, S230 and S240. Specifically, as shown in FIG. 3B, step S210 is first executed, in which the control module 190 calculates actual color coordinates based on the second photoelectric signal PS2. Next, step S220 is executed, in which the control module 190 determines whether the color coordinates to which the second photoelectric signal PS2 corresponds in chromaticity coordinates are expected values or not. If not, step S230 is executed, in which the control module 190 generates a current control signal CS. Moreover, step S240 is executed, in which the current control signal CS is transmitted to the excitation light source 110 to adjust light intensity of the excitation beam 50. When the control module 190 determines that the color coordinates to which the second photoelectric signal PS2 corresponds in chromaticity coordinates match the expected values, the execution of the illumination control method is terminated.

According to the illumination control method shown in FIG. 3B, the illumination system 100 and the projection device 200 are capable of easily adjusting the illumination beam 70 in the above illumination system 100 and projection device 200. In this way, the final output image beam 80 can have good color performance.

FIG. 4 is a schematic view showing architecture of another projection device according to an embodiment of the disclosure. Referring to FIG. 4, an illumination system 300 and a projection device 400 of the embodiment are similar to the illumination system 100 and the projection device 200 in FIG. 1A, and differences therebetween are as follows. As shown in FIG. 4, in the embodiment, the light homogenizing element 180 is located on the transmission path of the at least one converted beam 60, and is located between the wavelength conversion module 140 and the filter module 160. That is, in the embodiment, the light homogenizing element 180 is configured to homogenize the excitation beam 50 and the at least one converted beam 60 that are transmitted to the filter module 160. Then, the filter module 160 causes the at least one converted beam 60 and the excitation beam 50 to form the first set of color lights 70R and 70G and the second set of color light 70B, respectively, thereby forming the subsequent illumination beam 70 and image beam 80.

In the embodiment, since the illumination system 300 and the projection device 400 have similar structures to those of the illumination system 100 and the projection device 200 in FIG. 1A, and are also configured to execute the illumination control methods shown in FIG. 2B and FIG. 3B, the abovementioned advantages of the illumination system 100 and the projection device 200 are shared by the illumination system 300 and the projection device 400, and will not be repeated herein.

In the aforesaid embodiments, examples are given where the wavelength conversion module 140 included in the illumination systems 100 and 300 and the projection devices 200 and 400 is of a transmissive type. However, the disclosure is not limited thereto. In other embodiments, the wavelength conversion module may be a reflective wavelength conversion module. Any person skilled in the art may refer to the disclosure and make appropriate changes to an optical path thereof, and the changes should still fall within the scope of the disclosure. Some other embodiments will be explained below.

Figure 5A:
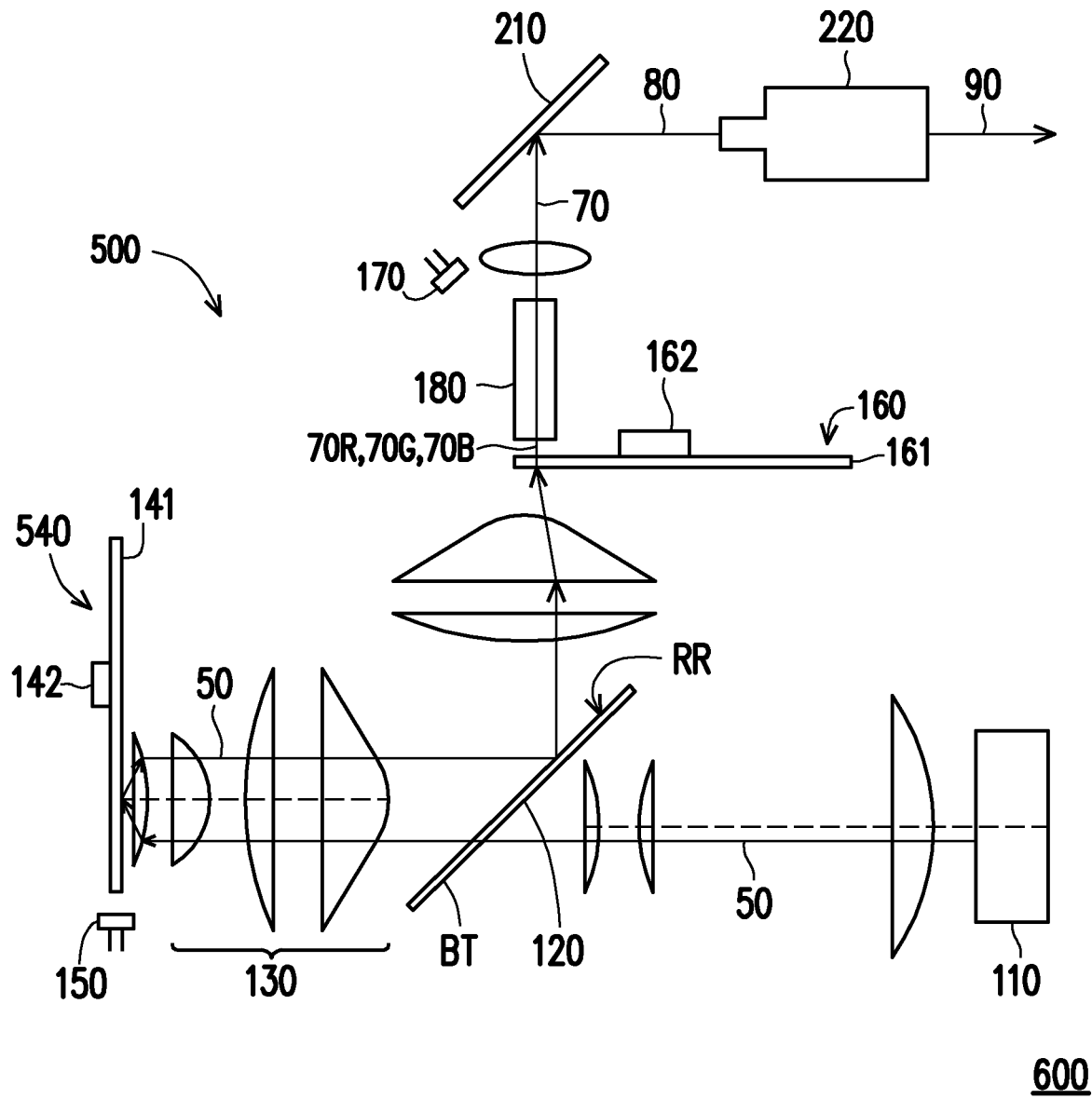
FIG. 5A is a schematic view showing architecture of still another projection device according to an embodiment of the disclosure.
Figure 5B:
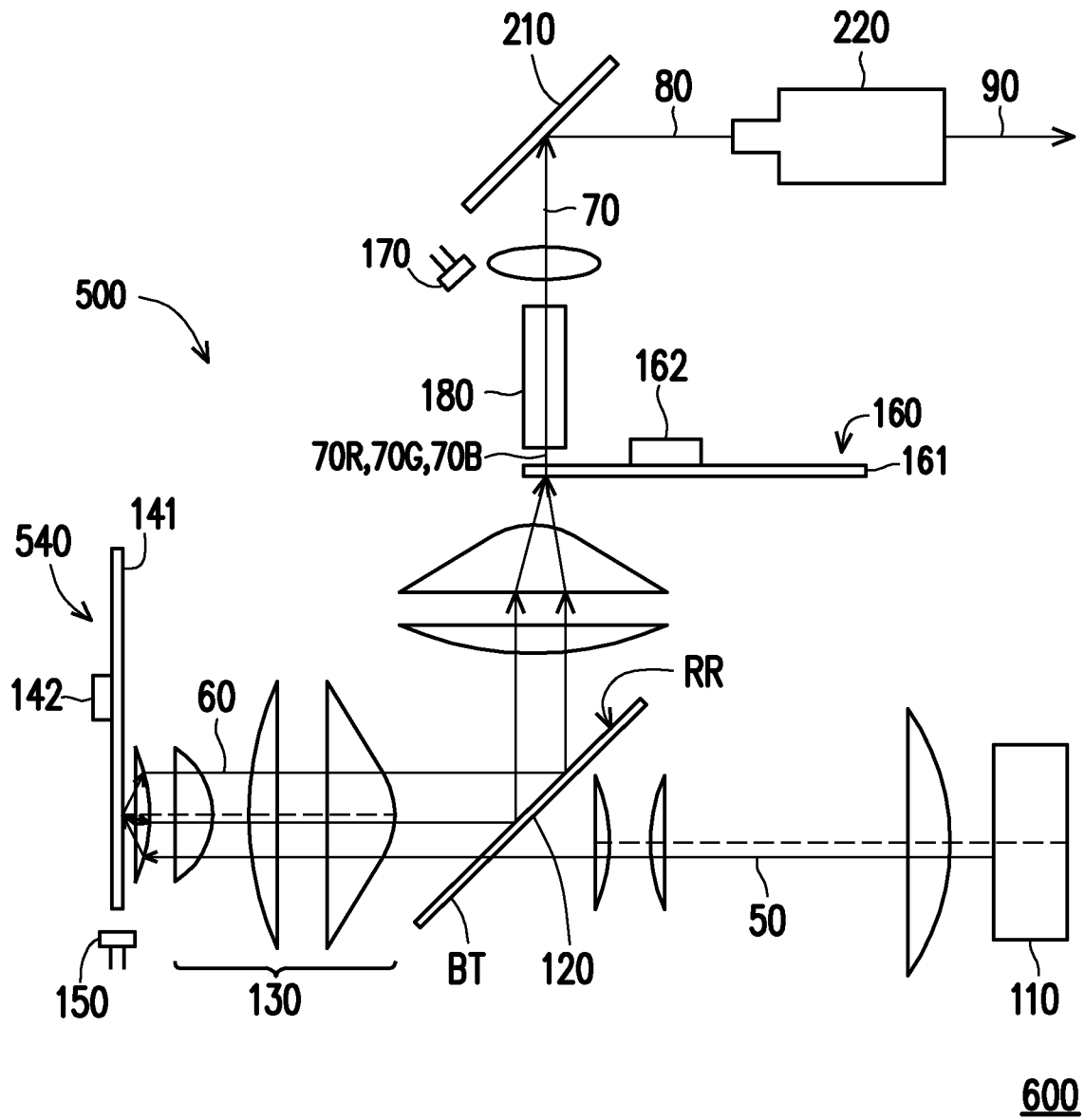
FIG. 5B is a schematic view showing architecture in which the projection device in FIG. 5A is generating a wavelength-converted beam.

FIG. 5A is a schematic view showing architecture of still another projection device according to an embodiment of the disclosure. FIG. 5B is a schematic view showing architecture in which the projection device in FIG. 5A is generating a wavelength-converted beam. Referring to FIG. 5A and FIG. 5B, an illumination system 500 and a projection device 600 of the embodiment are similar to the illumination system 100 and the projection device 200 in FIG. 1A, and differences therebetween are as follows. In the embodiment, a wavelength conversion module 540 is similar to the wavelength conversion module 140 in FIG. 1B, and the two differ in that, in the wavelength conversion module 540, a reflective layer (not illustrated) may be disposed on the first substrate 141 located in the non-conversion area NT in FIG. 1B. That is, the wavelength conversion module 540 is a reflective wavelength conversion module, and the non-conversion area NT of the wavelength conversion module 540 is configured to reflect the excitation beam 50. For example, in the embodiment, the reflective layer may be a metal film plated on the first substrate 141, and a material thereof may include silver or aluminum. Alternatively, the reflective layer may contain white scattering particles, wherein a material of the scattering particles may include titanium dioxide ($TiO_2$), silicon dioxide ($SiO_2$), aluminum oxide ($Al_2O_3$), boron nitride (BN), or zirconium dioxide ($ZrO_2$). However, the disclosure is not limited thereto.

Specifically, as shown in FIG. 5A, in the embodiment, when the non-conversion area NT of the wavelength conversion module 540 enters the irradiation range of the excitation beam 50, the excitation beam 50 is reflected by the wavelength conversion module 540, collected by the lens set 130 and then guided to a light reflective region RR of the light combining unit 120, and thus guided to the filter module 160. In another aspect, as shown in FIG. 5B, in the embodiment, after the at least one converted beam 60 is formed, the converted beam 60 from the wavelength conversion module 540 is also collected by the lens set 130 and then guided to the light reflective region RR of the light combining unit 120, and thus guided to the filter module 160. Then, the filter module 160 causes the at least one converted beam 60 and the excitation beam 50 to form the first set of color lights 70R and 70G and the second set of color light 70B, respectively, thereby forming the subsequent illumination beam 70 and image beam 80.

In the embodiment, since the illumination system 500 and the projection device 600 have similar structures to those of the illumination system 100 and the projection device 200 in FIG. 1A, and are also configured to execute the illumination control methods shown in FIG. 2B and FIG. 3B, the abovementioned advantages of the illumination system 100 and the projection device 200 are shared by the illumination system 500 and the projection device 600, and will not be repeated herein.

Figure 6A:
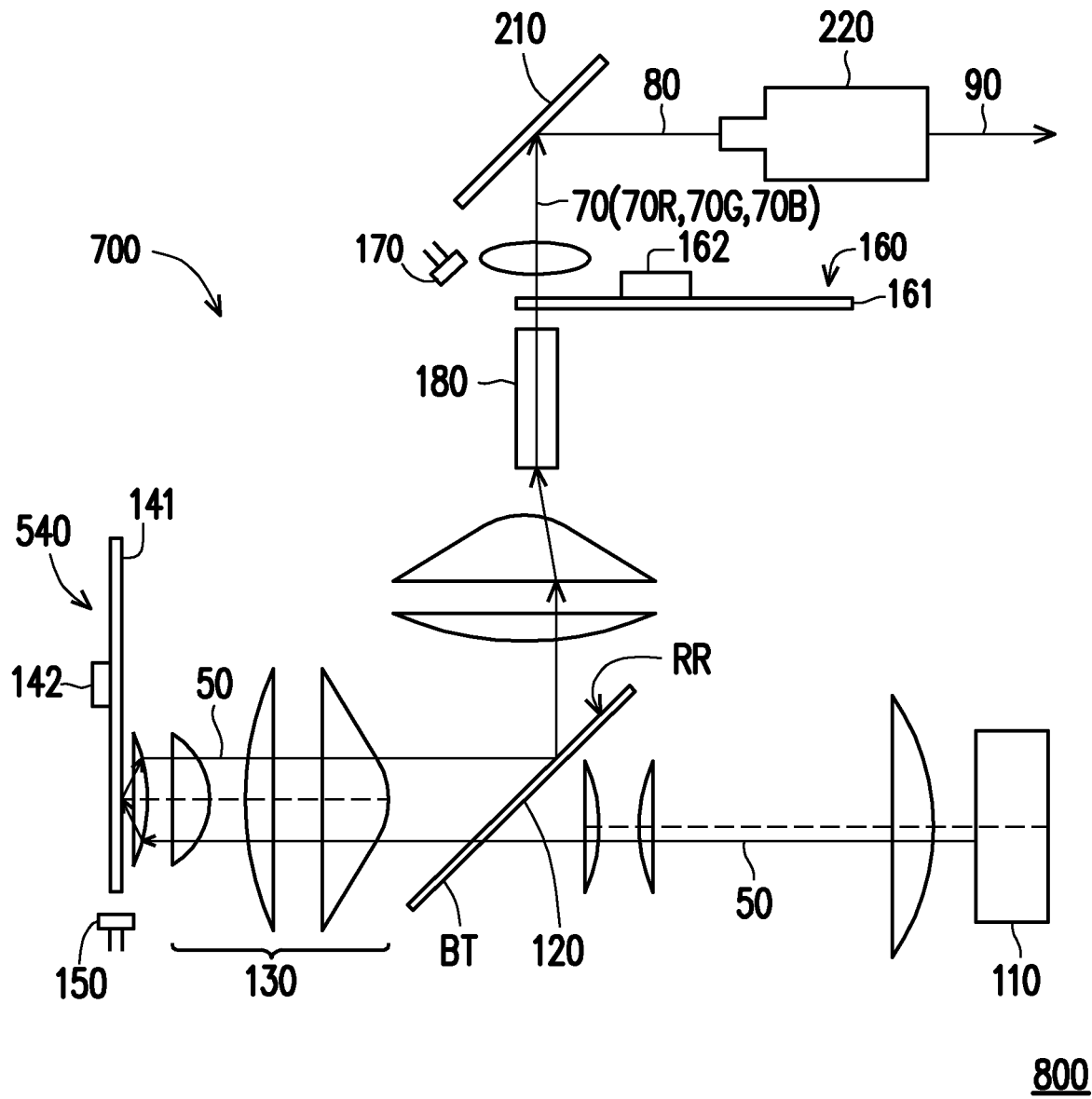
FIG. 6A is a schematic view showing architecture of still another projection device according to an embodiment of the disclosure.
Figure 6B:
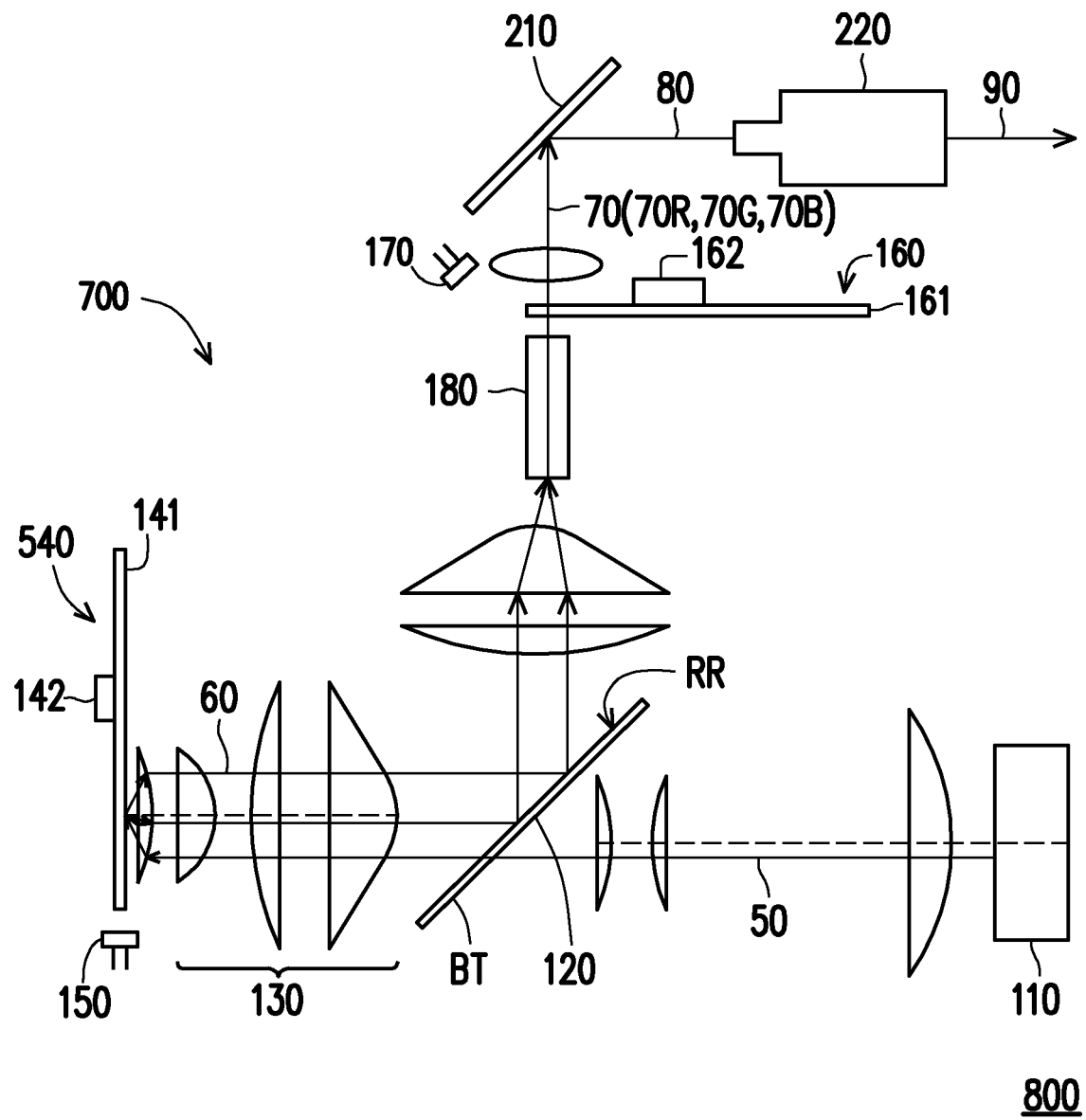
FIG. 6B is a schematic view showing architecture in which the projection device in FIG. 6A is generating a wavelength-converted beam.

FIG. 6A is a schematic view showing architecture of still another projection device according to an embodiment of the disclosure. FIG. 6B is a schematic view showing architecture in which the projection device in FIG. 6A is generating a wavelength-converted beam. Referring to FIG. 6A and FIG. 6B, an illumination system 700 and a projection device 800 of the embodiment are similar to the illumination system 500 and the projection device 600 in FIG. 5A and FIG. 5B, and differences therebetween are as follows. As shown in FIG. 6A and FIG. 6B, in the embodiment, the light homogenizing element 180 is located on the transmission path of the at least one converted beam 60, and is located between the wavelength conversion module 540 and the filter module 160. That is, in the embodiment, the light homogenizing element 180 is configured to homogenize the excitation beam 50 and the at least one converted beam 60 that are transmitted to the filter module 160. Then, the filter module 160 causes the at least one converted beam 60 and the excitation beam 50 to form the first set of color lights 70R and 70G and the second set of color light 70B, respectively, thereby forming the subsequent illumination beam 70 and image beam 80.

In the embodiment, since the illumination system 700 and the projection device 800 have similar structures to those of the illumination system 100 and the projection device 200 in FIG. 1A, and are also configured to execute the illumination control methods shown in FIG. 2B and FIG. 3B, the abovementioned advantages of the illumination system 100 and the projection device 200 are shared by the illumination system 700 and the projection device 800, and will not be repeated herein.

In summary, the embodiments of the disclosure at least have one of the following advantages or effects. In the embodiments of the disclosure, by acquiring the first photoelectric signal of the wavelength band of the light from the wavelength conversion module and the second photoelectric signal of the wavelength band of the light from the filter module, the illumination system and the projection device generate the synchronization signal. In this way, there is no need to additionally attach a timing mark and the number of assembly processes can be decreased. Also, the risk that assembly tolerance may cause a time error in the synchronization control can be avoided. The illumination control method according to the embodiments of the disclosure can easily adjust the illumination beam in the above illumination system and projection device such that the final output image beam can have good color performance.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An illumination system configured to provide an illumination beam, the illumination system comprising an excitation light source, a wavelength conversion module, a first sensor, a filter module, a second sensor and a control module, wherein
    the excitation light source is configured to emit an excitation beam;
    the wavelength conversion module is located on a transmission path of the excitation beam, and has at least one wavelength conversion area configured to convert the excitation beam into at least one converted beam,
    the first sensor is located beside and faces the transmission path of the excitation beam, and is configured to receive a part of the excitation beam and a part of the at least one converted beam that are scattered by the wavelength conversion module, so as to generate a first photoelectric signal;
    the filter module is located on the transmission path of the excitation beam and the at least one converted beam, and has at least one filter area and a diffusion area, wherein the at least one filter area is configured to cause the at least one converted beam to form a first set of color light, and the diffusion area is configured to cause the excitation beam to form a second set of color light;
    the second sensor is located beside and faces a transmission path of the first set of color light and the second set of color light, and is configured to receive a part of the first set of color light and a part of the second set of color light that are scattered by the filter module, so as to generate a second photoelectric signal; and
    the control module is electrically connected to the first sensor and the second sensor, and is configured to receive the first photoelectric signal and the second photoelectric signal, wherein the control module generates a synchronization signal based on a relative intensity change of the first photoelectric signal and a relative intensity change of the second photoelectric signal, and the synchronization signal is transmitted to the wavelength conversion module and the filter module, so that the wavelength conversion module and the filter module are controlled to synchronize with each other, and the first set of color light and the second set of color light formed by the filter module sequentially form the illumination beam.

2. The illumination system according to claim 1, wherein the control module determines whether the at least one wavelength conversion area has entered an irradiation range of the excitation beam or not based on the relative intensity change of the first photoelectric signal, and determines whether the at least one filter area has entered an irradiation range of the at least one converted beam or not based on the relative intensity change of the second photoelectric signal.

3. The illumination system according to claim 1, wherein the control module is electrically connected to the excitation light source, and the second sensor comprises a chromaticity sensor, wherein the control module determines whether color coordinates to which the second photoelectric signal corresponds in chromaticity coordinates are expected values or not, and if not, the control module generates a current control signal, and the current control signal is transmitted to the excitation light source to adjust light intensity of the excitation beam.

4. The illumination system according to claim 1, wherein the wavelength conversion module further has a non-conversion area, and the wavelength conversion module further comprises a first substrate, at least one wavelength conversion layer and a first driving device, wherein
    the at least one wavelength conversion layer is disposed on the first substrate and is disposed corresponding to the at least one wavelength conversion area;
    the first driving device is configured to drive the first substrate to rotate, and when the first substrate rotates, the at least one wavelength conversion area and the non-conversion area enter an irradiation range of the excitation beam during different periods.

5. The illumination system according to claim 4, wherein the filter module comprises a second substrate, at least one filter layer, a diffusion layer and a second driving device, wherein
    the at least one filter layer is disposed on the second substrate and is disposed corresponding to the at least one filter area;
    the diffusion layer is disposed on the second substrate and is disposed corresponding to the diffusion area;
    the second driving device is configured to drive the second substrate to rotate, wherein when the second substrate rotates, the at least one filter area enters an irradiation range of the at least one converted beam during different periods, and the diffusion area enters the irradiation range of the excitation beam during different periods.

6. The illumination system according to claim 5, wherein the control module is electrically connected to the first driving device and the second driving device, the first driving device controls a rotation period of the first substrate based on the synchronization signal from the control module, and the second driving device controls a rotation period of the second substrate based on the synchronization signal from the control module.

7. The illumination system according to claim 5, wherein, based on the synchronization signal from the control module, the first driving device and the second driving device respectively control the at least one filter area to enter the irradiation range of the at least one converted beam when the at least one wavelength conversion area of the wavelength conversion module enters the irradiation range of the excitation beam.

8. The illumination system according to claim 1, further comprising:
  a light combining unit located between the excitation light source and the wavelength conversion module and located on the transmission path of the at least one converted beam and the excitation beam.

9. The illumination system according to claim 1, further comprising:
  a light homogenizing element located on the transmission path of the at least one converted beam to homogenize the at least one converted beam.

10. The illumination system according to claim 1, further comprising:
  a light homogenizing element located on the transmission path of the first set of color light and the second set of color light to homogenize the first set of color light and the second set of color light.

11. A projection device, comprising an illumination system, a light valve and a projection lens, wherein
  the illumination system is configured to provide an illumination beam, and comprises an excitation light source, a wavelength conversion module, a first sensor, a filter module, a second sensor and a control module, wherein
    the excitation light source is configured to emit an excitation beam;
    the wavelength conversion module is located on a transmission path of the excitation beam, and has at least one wavelength conversion area configured to convert the excitation beam into at least one converted beam,
    the first sensor is located beside and faces the transmission path of the excitation beam, and is configured to receive a part of the excitation beam and a part of the at least one converted beam that are scattered by the wavelength conversion module, so as to generate a first photoelectric signal;
    the filter module is located on the transmission path of the excitation beam and the at least one converted beam, and has at least one filter area and a diffusion area, wherein the at least one filter area is configured to cause the at least one converted beam to form a first set of color light, and the diffusion area is configured to cause the excitation beam to form a second set of color light;
    the second sensor is located beside and faces a transmission path of the first set of color light and the second set of color light, and is configured to receive a part of the first set of color light and a part of the second set of color light that are scattered by the filter module, so as to generate a second photoelectric signal;
    the control module is electrically connected to the first sensor and the second sensor, and is configured to receive the first photoelectric signal and the second photoelectric signal, wherein the control module generates a synchronization signal based on a relative intensity change of the first photoelectric signal and a relative intensity change of the second photoelectric signal, and the synchronization signal is transmitted to the wavelength conversion module and the filter module, so that the wavelength conversion module and the filter module are controlled to synchronize with each other, and the first set of color light and the second set of color light formed by the filter module sequentially form the illumination beam;
  the light valve is located on a transmission path of the illumination beam and is configured to convert the illumination beam into an image beam; and
  the projection lens is located on a transmission path of the image beam and is configured to cause the image beam to form a projection beam.

12. The projection device according to claim 11, wherein the control module determines whether the at least one wavelength conversion area has entered an irradiation range of the excitation beam or not based on the relative intensity change of the first photoelectric signal, and determines whether the at least one filter area has entered an irradiation range of the at least one converted beam or not based on the relative intensity change of the second photoelectric signal.

13. The projection device according to claim 11, wherein the control module is electrically connected to the excitation light source, and the second sensor comprises a chromaticity sensor, wherein the control module determines whether color coordinates to which the second photoelectric signal corresponds in chromaticity coordinates are expected values or not, and if not, the control module generates a current control signal, and the current control signal is transmitted to the excitation light source to adjust light intensity of the excitation beam.

14. The projection device according to claim 11, wherein, based on the synchronization signal from the control module, a first driving device of the wavelength conversion module and a second driving device of the filter module respectively control the at least one filter area to enter an irradiation range of the at least one converted beam when the at least one wavelength conversion area of the wavelength conversion module enters an irradiation range of the excitation beam.

15. The projection device according to claim 11, wherein the control module is electrically connected to the light valve, and the light valve modulates the illumination beam based on the synchronization signal from the control module, so as to form the image beam.

16. The projection device according to claim 11, further comprising:
  a light homogenizing element located on the transmission path of the at least one converted beam to homogenize the at least one converted beam.

17. The projection device according to claim 11, further comprising:
  a light homogenizing element located on the transmission path of the first set of color light and the second set of color light to homogenize the first set of color light and the second set of color light, wherein the light homogenizing element is located between the filter module and the light valve.

18. An illumination control method configured to control an illumination system in a projection device, the illumination system comprising an excitation light source, a wavelength conversion module, a first sensor, a filter module and a second sensor, the excitation light source being configured to emit an excitation beam, the wavelength conversion module being located on a transmission path of the excitation beam and being configured to convert the excitation beam into at least one converted beam, the first sensor being located beside and faced the transmission path of the excitation beam, the filter module being located on the transmission path of the excitation beam and the at least one converted beam and being configured to cause the at least one converted beam to form a first set of color light and to cause the excitation beam to form a second set of color light, and the second sensor being located beside and faced a transmission path of the first set of color light and the second set of color light, wherein the illumination control method comprises:

sensing, by the first sensor, a part of the excitation beam and a part of the at least one converted beam that are scattered by the wavelength conversion module, so as to generate a first photoelectric signal;

sensing, by the second sensor, a part of the first set of color light and a part of the second set of color light that are scattered by the filter module, so as to generate a second photoelectric signal;

generating a synchronization signal based on a relative intensity change of the first photoelectric signal and a relative intensity change of the second photoelectric signal; and transmitting the synchronization signal to the wavelength conversion module and the filter module, so as to control the wavelength conversion module and the filter module to synchronize with each other, and to cause the first set of color light and the second set of color light formed by the filter module to sequentially form an illumination beam.

19. The illumination control method according to claim 18, further comprising:

determining whether at least one wavelength conversion area of the wavelength conversion module has entered an irradiation range of the excitation beam or not based on the relative intensity change of the first photoelectric signal, and determining whether at least one filter area of the filter module has entered an irradiation range of the at least one converted beam or not based on the relative intensity change of the second photoelectric signal.

20. The illumination control method according to claim 19, further comprising:

based on the synchronization signal, controlling the at least one filter area to enter the irradiation range of the at least one converted beam when the at least one wavelength conversion area of the wavelength conversion module enters the irradiation range of the excitation beam.

21. The illumination control method according to claim 18, further comprising:

determining whether color coordinates to which the second photoelectric signal corresponds in chromaticity coordinates are expected values or not, and if not, generating a current control signal; and transmitting the current control signal to the excitation light source to adjust light intensity of the excitation beam.

22. The illumination control method according to claim 8, wherein the projection device comprises a light valve, and the illumination control method further comprises:

transmitting the synchronization signal to the light valve, and modulating the illumination beam by the light valve based on the synchronization signal, so as to form an image beam.

\* \* \* \* \*